INVENTOR.
Murry N. Fairbank
BY Brown and Mikulka
and
Robert T. Peck
ATTORNEYS

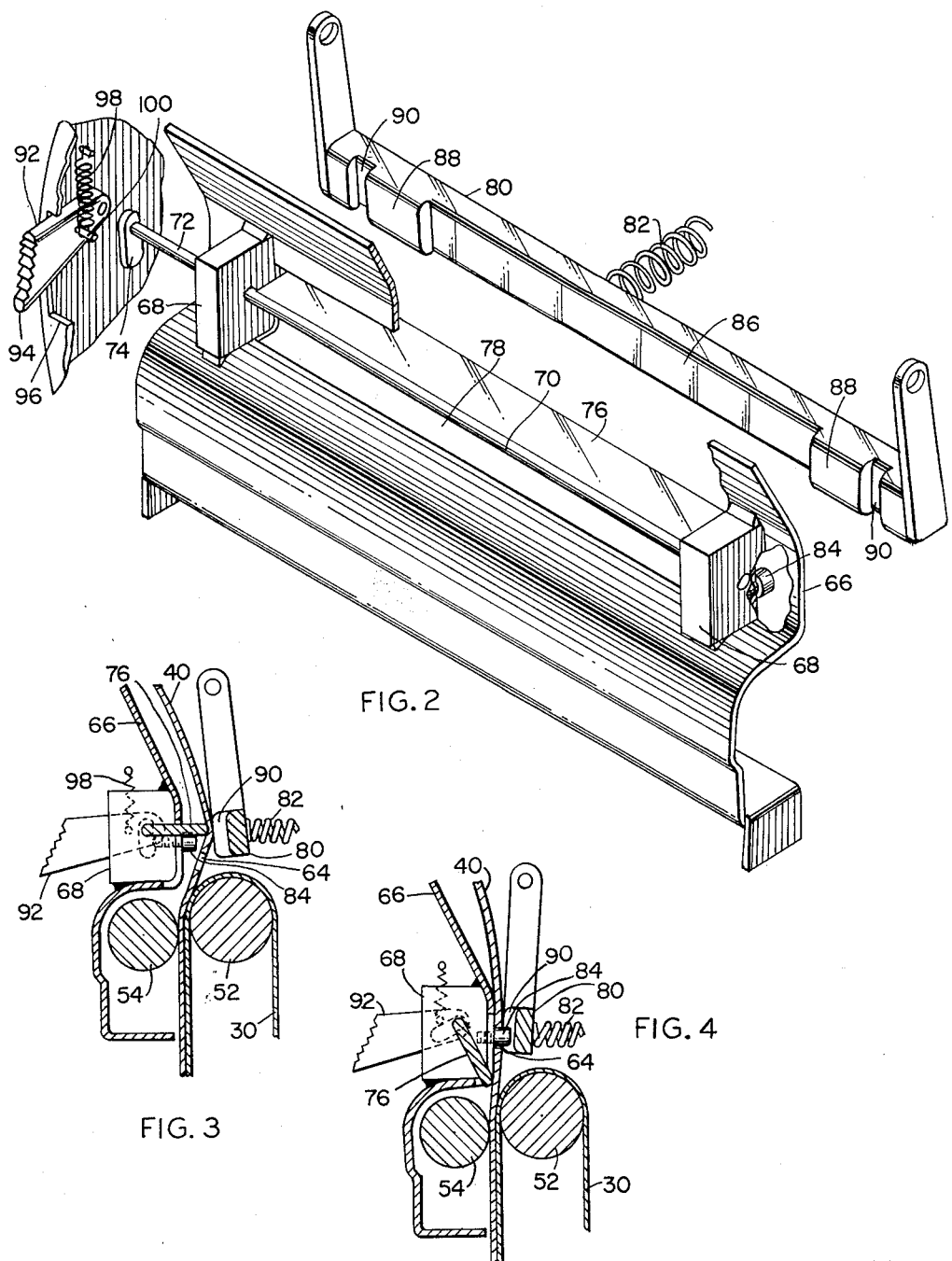

United States Patent Office 3,087,399
Patented Apr. 30, 1963

3,087,399
PHOTOGRAPHIC APPARATUS
Murry N. Fairbank, Belmont, Mass., assignor to Polaroid Corporation, Cambridge, Mass., a corporation of Delaware
Filed Apr. 29, 1960, Ser. No. 25,709
16 Claims. (Cl. 95—31)

This invention relates generally to photographic apparatus and in particular to photographic apparatus having a device for successively arresting and releasing photographic sheet material on its passage through the apparatus.

In U.S. Patent No. 2,543,159, issued February 27, 1951 to Murry N. Fairbank, there is shown photographic apparatus in the form of a camera of the well known self-processing type in which the photographic sheet material must be successively withdrawn from the camera following exposure to effect processing of the sheet material in the camera. It is advantageous in such cameras to have a device which positively arrests movement of the sheet material until the camera user desires to withdraw a portion of the sheet material from the camera. It is also advantageous to have such an arresting device arranged for selective release or disengagement from the photographic sheet material to allow withdrawal of the sheet material. Additionally, it is desirable to have the arresting device function automatically to arrest movement of the sheet material upon withdrawal from the camera of a predetermined length thereof. One form of such device incorporating the aforementioned advantages is shown in the aforesaid Fairbank patent.

In this patent the device comprises one or more stops arranged for engaging and disengaging the photographic sheet material for respectively arresting and releasing the material. Such sheet material is shown to be formed along its length with a series of regularly spaced openings, with the arrest of the material being effected by movement of the stop into one of these openings and the release of the material being effected by the reverse movement of the stop, out of the opening. The stop is so mounted that its reverse movement is accompanied by movement of the stop in a direction parallel to the length of the material such that the stop moves away from the opening which it engaged and returns automatically to a position in contact with a portion of the sheet material lying between adjacent openings. The stop and the material are biased toward one another and in the latter position of the stop it is ready to move into the next opening of the sheet material as this opening comes into alignment with the stop, and thus automatically engage the material and arrest further motion.

Such a device is essentially satisfactory but a drawback arises if the camera user ever mistakenly assumes during withdrawal of the sheet material that it has been moved sufficiently far to cause a stop to enter an opening. The camera user may make such a mistake whenever the sheet material encounters an increased resistance on its passage through the apparatus for there will be a tendency on the part of the camera user to attribute this increased resistance to the engagement of the material with the stop. Since the photographic apparatus shown in the Fairbank patent is of the kind in which the processing of one photographic sheet is effected by superposing it upon another sheet, with containers of photographic processing fluid sandwiched between them, wherein such superposed sheets pass between two pressure-applying members disposed to rupture the containers and spread the fluid as a layer between the sheets to effect processing, and since one of the sheets includes means for collecting any excess fluid processing composition wherein such collecting means add thickness to the superposed sheets, the arrival of the collecting means at the pressure-applying members naturally increases the resistance to movement encountered by the sheet material and can easily allow the camera user to assume that this increased resistance is attributable to the operation of the stop. This increased resistance occurs very near the end of normal withdrawal and the user, if mistakenly assuming the sheet to be arrested by the stop, will discontinue further withdrawal. However, the sheet material may be stopped just prior to engagement by the stop member and in processing the netx portion of the sheet material, the user will actuate the stop mechanism to no avail for almost as soon as withdrawal begins, the stop will engage the sheet material and the user, not expecting such engagement, will continue pulling, with resultant ripping or tearing of the sheet material at the point of engagement, either partially or completely.

When such ripping occurs, no longer can the camera user withdraw the remaining portion of the sheet material from the camera; it follows that such remaining sheet material is ruined, for the camera back must be opened to manipulate the material, and when this occurs the unexposed sheet material remaining in the camera will be destroyed.

An attempt was made to eliminate the possible drawback of the Fairbank structure by the arrangement shown in U.S. Patent No. 2,843,029, issued July 15, 1958 to John W. Lothrop et al. In the Lothrop et al. patent, the stop, as in the Fairbank arrangement, is arranged to engage successively a series of regularly spaced openings in the photographic sheet material on its movement through the camera, but it has the additional feature of being locked in a position at which it cannot engage the sheet material until a predetermined length of sheet material has been withdrawn from the camera following actuation by the user of the stop disengaging means. Thus, even though the camera user fails to withdraw the proper amount of sheet material, actuation of the stop disengaging means will again lock the stop out of possible engagement with the sheet until the openings thought to be engaged have passed the stop means. This happens because the predetermined length of material is calculated to insure such action.

It is thus seen that the Lothrop et al. arrangement eliminates the possible drawback of the Fairbank structure, but not without attendant increased cost of manufacture and accompanying complexity of camera mechanism, for the locking mechanism comprises additional structure which must be added to the Fairbank device.

It is a primary object of the present invention to provide a new and improved device for successively arresting and releasing photographic sheet material on its passage through photographic apparatus wherein simplicity and reliability keynote the invention.

It is another object of the invention to provide such a device as a part of a self-processing camera in which the device functions to minimize the possibility of inadvertent ripping or tearing of the photographic sheet material used with such cameras.

Briefly, in one aspect thereof, the invention comprises a movable control member and at least one stop member arranged within a camera of the self-processing type, proximate to the path followed by photographic sheet material on its passage through the camera. In a first position of the control member, it is adapted to hold the sheet material away from the stop to prevent engagement thereby. The control member is automatically movable into a second position by frictional engagement of a portion thereof with the sheet material as the latter moves, and when in its second position, the control member permits engagement of the sheet material by the stop member. Means are provided to enable the camera user to move the control member from its second to its first position, as desired.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 2 is a fragmentary, exploded perspective view of the sheet-arresting and releasing mechanism shown in FIG. 1; and FIGURES 3 and 4 are fragmentary sectional views of the camera of FIG. 1 illustrating the operation of the mechanism of FIG. 2 and showing the mechanism in different operative positions.

Figure 1:
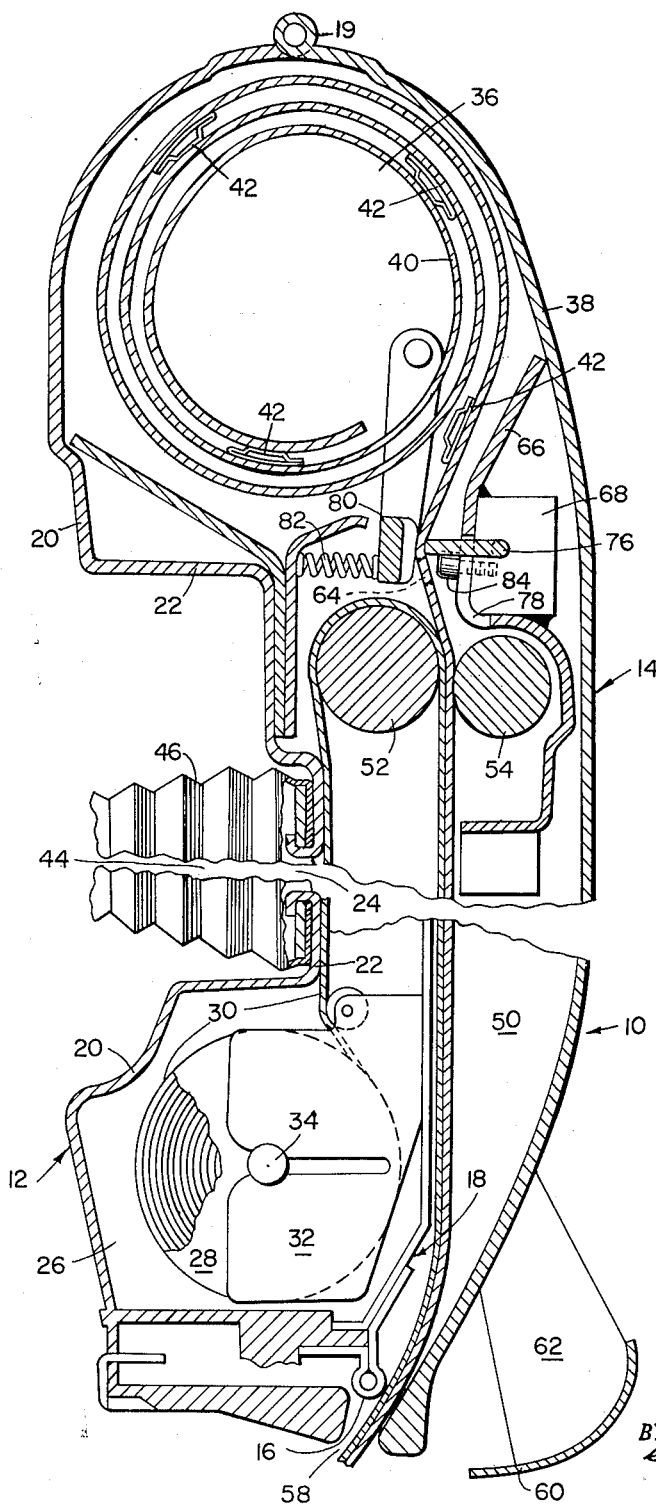
FIGURE 1 is a fragmentary, diagrammatic, sectional view of photographic apparatus in the form of a self-processing camera embodying the sheet-arresting and releasing mechanism of the invention.

The sheet-arresting and releasing mechanism of the present invention is particularly adapted for use in photographic apparatus of the type herein illustrated and which generally includes means for processing successive exposed frames of a photosensitive sheet by superposing said frames on successive areas of a second sheet and by spreading a fluid processing composition in a thin layer between the superposed frames and areas of the sheets. The photosensitive sheet may include a layer of photosensitive material such as a silver halide emulsion in which a latent image is produced by differential exposure to actinic light and carried on a suitable support or backing. The second sheet is preferably adapted to serve as a support for an image-receptive layer in which a visible print of a latent image in the photosensitive layer may be produced. The processing composition is preferably capable, when spread in a thin layer between an exposed frame of the photosensitive sheet and an area of the second sheet, of effectuating a silver halide diffusion transfer reversal process by which a latent image in the photosensitive sheet is developed and a positive print is produced on the second sheet. The second sheet may also include means for collecting any excess of processing composition. Examples of photographic materials useful in processes of the foregoing type and of processes which the camera is adapted to perform are described in detail in U.S. Patent No. 2,543,181, issued February 27, 1951, U.S. Patent No. 2,662,822, issued December 15, 1953, and U.S. Patent No. 2,686,717, issued August 17, 1954, all in the name of Edwin H. Land.

It is to be understood, of course, that the apparatus herein described is not limited to use with any particular species of photosensitive or second sheets, the terms "photosensitive" and "second" sheet being used in a broader sense to indicate a first sheet which is photosensitive and a second sheet which may merely aid in spreading the processing composition over a surface of the photosensitive sheet or may, if desired, possess other characteristics. It is also to be understood that while the sheet-arresting and releasing mechanism of the invention is particularly adapted for use in one type of photographic apparatus, it has equal utility in other forms of apparatus wherein sheet materials are advanced manually and are arrested by engagement of a portion of the apparatus with engageable portions of the sheet.

Generally, the camera in which the sheet-arresting and releasing mechanism is embodied includes an exposure chamber, in which portions of frames of a photosensitive sheet may be successively positioned for exposure to actinic light, and a processing chamber into which said portions are advanced during processing. At the entrance to the processing chamber there is provided a pair of pressure-applying members, for example rollers, adapted to receive therebetween a portion of the photosensitive sheet comprising an exposed frame from the exposure chamber and to superpose said portion of said photosensitive sheet with a second sheet. The second sheet has, on one of its surfaces, a succession of image-receiving areas arranged for registration with said frames and has affixed thereto a succession of containers of the fluid processing composition; one container being associated with each image-receiving area. As the sheets are advanced in superposed relation, between the pressure-applying rollers, processing composition is ejected from a container and spread in a thin layer between a frame of the photosensitive sheet and an image-receiving area of the second sheet, thereby forming a sandwich which is advanced into the processing chamber. The arresting mechanism is provided between the exposure chamber and the pressure-applying rollers for arresting advancement of the sheets when one frame and the image-receiving area, with which it is registered and superposed, have passed entirely between the rollers into the processing chamber and another frame of the photosensitive sheet is in position for exposure. The aforementioned superposed frame and area are allowed to remain within the processing chamber for a predetermined period during which a positive print is formed on the receiving area of the second sheet, and at the end of the predetermined processing period, the processing chamber may be opened and the developed positive print may be removed.

Reference is now made to the drawings and particularly to FIGURE 1 wherein there is shown, somewhat schematically, a hand-held camera of the folding type embodying the present invention.

The camera comprises a housing 10 including a forward section 12 and a rear section 14 for mounting and enclosing the various components of the camera mechanism. In order to provide access to the interior of the camera housing, forward and rear housing sections 12 and 14 are pivotably secured to one another at one end, described for purposes of illustration as the upper end, by a hinge 19, and the two housing sections include side walls which cooperate to provide a light-tight chamber when the two housing sections are in the closed or operative position shown. The housing comprises an intermediate section 18 pivotably mounted on hinge 16 at its lower end on forward housing section 12 between the forward and rear housing sections. Forward housing section 12 comprises a forward wall 20 and a central re-entrant section 22 provided with an exposure aperture 24 through which light is transmitted for exposing photosensitive materials positioned within the housing. Re-entrant section 22 further provides guide tracks on opposite sides of exposure aperture 24 for supporting an exposure frame of a photosensitive sheet in position for exposure across aperture 24.

The camera housing includes means for storing a supply of photosensitive sheet materials and this means, in the form shown, comprises a lower storage chamber 26 defined by forward wall 20 and intermediate housing section 18. Means are provided in lower chamber 26 for mounting a spool 28, around which is coiled an elongated photosensitive sheet 30, and comprise mounting members 32 adapted for pivotably engaging shafts 34 at the ends of spool 28. A second storage chamber 36 is provided in the upper portion of the camera housing between forward wall 20 and a rear wall designated 38 of rear housing section 14. Chamber 36 is adapted to contain a roll of a second or print-receiving sheet 40.

Photosensitive sheet 30 is preferably elongated and comprises a succession of areas or exposure frames adapted to be exposed through aperture 24. The second or print-receiving sheet 40 comprises a sequence of print-receiving areas, each adapted to be superposed with an exposed frame of the photosensitive sheet and to act as a support for a transfer print. A succession of containers designated 42 are provided mounted on print-receiving sheet 40 at substantially regularly spaced intervals with the containers are spaced so that one container is associated with one print-receiving area. Each container is provided with a discharge mouth facing the print-receiving area with which it is associated and located adjacent the leading edge of the print-receiving area so that the fluid contents of the container will be discharged toward the print-receiving area when compressive forces are applied to the container.

The camera includes an exposure chamber designated 44 defined by intermediate housing section 18, re-entrant section 22 and bellows 46 connected to a conventional lens and shutter assembly (not shown). Photosensitive sheet 30, when loaded into the camera, extends from lower chamber 26 upward through exposure chamber 44 across aperture 24 and is supported in position for exposure on the guide tracks provided by re-entrant section 22. Means such as a pressure plate and spring (not shown) are provided on the forward side of intermediate housing section 18 for holding the photosensitive sheet against the guide tracks in position for exposure. The camera includes a processing chamber 50 at the rear of the exposure chamber and defined by intermediate housing section 18 and rear wall 38. Means are provided for superposing the photosensitive sheet with the second sheet and applying compressive pressure to the sheets and, in the form shown, comprise a pair of cylindrical rollers 52 and 54 mounted in juxtaposition at the upper ends of exposure chamber 44 and processing chamber 50 between said chambers and storage chamber 36. Photosensitive sheet 30 is guided upward from storage chamber 26 through exposure chamber 44 around roller 52 and downward between the latter and roller 54 into processing chamber 50. The second sheet 40 is guided downward from storage chamber 36 into superposition with the photosensitive sheet between rollers 52 and 54 into processing chamber 50. The rollers are adapted to superpose each exposed frame of the photosensitive sheet with a print-receiving area of the second sheet and spread the fluid contents of a container associated with the print-receiving area between the frame and area to form a sandwich as the sheets are advanced into the processing chamber.

In order to permit loading and threading of the sheet materials into the camera, roller 52 is pivotably mounted on the upper end of intermediate housing section 18 and is biased rearwardly toward roller 54 by a spring (not shown) mounted, for example, on forward wall 20. Roller 54 is pivotably mounted at its ends on rear wall 38 so that it is possible by virtue of this arrangement to insert a spool of photosensitive sheet material into lower chamber 26 and thread the sheet material across the exposure aperture and around roller 52 into superposition with second sheet 40 which is threaded, together with the photosensitive sheet between the two rollers into processing chamber 50. The lower and intermediate housing sections are so constructed as to provide, at the lower end of processing chamber 50 opposite rollers 52 and 54, an exit passage 58 through which portions of the sandwich positioned within the processing chamber may be drawn. An operator, by grasping the leading portions of the sandwich extending through exit passage 58, may draw the sandwich through the passage and thereby advance a predetermined portion of sheets 30 and 40 between rollers 52 and 54 into processing chamber 50, whereby a frame of photosensitive sheet 30, initially positioned for exposure across aperture 24, is advanced into registration with a print-receiving area of sheet 40. Continued advancement of sheets 30 and 40 between rollers 52 and 54 causes ejection of the processing composition from a container 42 associated with the frame and area and causes spreading of the processing fluid between the frame and area to form a sandwich which advances into the processing chamber. This sandwich is retained within the processing chamber for a predetermined period during which a positive print is preferably formed in the print-receiving area of the second sheet.

Means are provided for excluding light from processing chamber 50 during the processing of a frame and print-receiving area positioned therein. Accordingly, means are provided for preventing light from entering passage 58 and comprises a cutter bar 60 pivotably secured by legs 62 to rear housing section 14 and having an edge portion which, when bar 60 is in a closed position across passage 58, contacts portions of the shutter housing in the region of passage 58. The cutter bar also serves as a cutting blade against which an operator can draw portions of a sandwich projecting through passage 58 for severing said portions from portions within processing chamber 50.

A mechanism is provided in the camera housing between storage chamber 36 and processing chamber 50 for arresting the movement of a sandwich upon advancement of a predetermined length thereof between rollers 52 and 54 so as to position the next successive exposure frame for exposure within the exposure chamber. The sheet-arresting mechanism is intended to operate on the print-receiving sheet 40, and to adapt sheet 40 for this purpose, it is provided with pairs of regularly spaced perforations or openings 64, the openings of each pair being in opposite marginal portions of sheet 40, and one pair being associated with one print-receiving area of sheet 40.

The sheet-arresting mechanism includes a guide plate 66 mounted within the camera housing on rear wall 38 between storage chamber 36 and processing chamber 50 for supporting and guiding second sheet 40 from the storage chamber between rollers 52 and 54 into the processing chamber. Guide plate 66 is approximately equal in width to the width of the second sheet and is shaped so as to provide a space between the guide plate and rear wall 38 in which some elements of the arresting mechanism are housed.

Secured rigidly to guide plate 66 and extending therefrom between it and rear wall 38 is a pair of spaced bearing members 68 in which is journaled a shaft 70, one end of which extends beyond one of the bearing members as at 72, on which the extreme outer tip thereof is fastened a small crank member 74. Rigidly fastened to shaft 70 between the bearing members 68 is a control member 76 in the form of an elongated rigid plate extending through an opening 78 provided in guide member 66 toward a pivotally mounted platen-like member 80.

Member 80 is pivotally mounted within the camera housing and is normally biased toward guide plate 66 by spring 82 which has its ends fixed respectively to an inner portion of the camera housing and a portion of member 80.

Also mounted on the guide plate 66 is a pair of spaced stop members 84 which may be in the form of pins having threaded shanks which cooperate with suitable threaded apertures provided in bearing members 68 to hold the stop members securely in place on the guide plate.

Member 80 has a portion removed along its central section as at 86, to form at its outer ends the platen sections 88 which in turn are cut away to form the transverse slots 90.

Cooperating with the crank 74 is a pivotally mounted actuating lever 92 (shown only in FIG. 2) the free end of which is serrated at 94 where it protrudes through an opening 96 provided in rear wall 38. As is shown in FIG. 2, lever 92 is biased upwardly against an edge of opening 96 by means of spring 98, one end of the spring being secured to a portion of the camera housing and the other end of the spring being secured to a pin 100 attached to lever 92. Pin 100 lies adjacent crank 74 and is adapted to move the crank upon actuation of lever 92 whenever the crank is in a predetermined control position.

As shown in FIGURE 1, control member 76 is in a first position wherein its transverse edge contacts second sheet 40 and holds it against platen sections 88 which in turn have been moved away from guide plate 66 against the biasing of spring 82 by virtue of the position of control member 76. It is also seen in FIGURE 1 that when the sheet 40 is so held, openings 64 have been disengaged from stop members 84 and the sheet is no longer arrested from movement through the camera.

As the sheet 40 moves through the camera past control member 76, the frictional engagement between the two will allow the sheet to rotate the control member downwardly (as viewed in FIG. 1), away from sheet 40 and platen-like member 80, until the control member reaches a second position substantially wholly within the opening provided in guide member 66. Sometime shortly before the control member 76 is moved within opening 78, the sheet 40 will contact the edge portions of stop members 84 and ride over these stop members until a pair of apertures 64 align themselves with the stop members, at which time the sheet will move onto the stops because of its inherent resiliency and thus be arrested in its movement. The arrested position is shown in FIG. 4, at which position the control member 76 is substantially within opening 78 with its crank 74 lying against the pin 100.

Assuming that the camera user wishes to move the sheet once again, the lever 92 may be depressed and the control pin 100 will rotate the control member back to its first position. During this rotation of the control member, its outer edge will engage the sheet material, move it away from stops 84 against platen sections 88 and then move the sheet and the platen member 80 together until the control member reaches its first position. The sheet is thus disengaged from the stops and withdrawal of the sheet will be permitted, which action will again move the control member from its first position at which it is substantially perpendicular to the path of the sheet material 40 (shown in FIGS. 1 and 3) to its second position at which it is substantially parallel to said path (shown in FIG. 4).

It is to be noted that the control member 76 has a radius of movement which insures that apertures 64 move well past stop members 84 before any increased resistance to withdrawal of sheet member 40 occurs. That is, a predetermined length of sheet material 40 must move past stop members 84 to move control member 76 to its second position at which it no longer prevents engagement of the sheet by the stop members. If for any reason the camera user discontinues withdrawal of the sheet material just prior to its arrest by engagement with stop members 84, actuation of lever 92 will return control member 76 to its first position where it will prevent unexpected engagement of the sheet which the camera user has mistakenly assumed to have already occurred.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In photographic apparatus adapted to permit photographic sheet material to pass therethrough, means for controlling the movement of said sheet material comprising, in combination: stop means adapted to engage the sheet material for arresting its movement through said apparatus; movable control means which in a first position is adapted to hold the sheet material away from the stop means to prevent engagement thereby, said movable control means being adapted for movement into a second position by frictional engagement of a portion thereof with the sheet material when it moves through the photographic apparatus, said control means when in said second position permitting engagement of the sheet material by said stop means; and means for moving said control means from said second position to said first position.

2. In photographic apparatus adapted to permit photographic sheet material to pass therethrough, means for controlling the movement of said sheet material comprising, in combination: fixed stop means adapted to engage the sheet material for arresting its movement through said apparatus; movable control means which in a first position is adapted to hold the sheet material away from the stop means to prevent engagement thereby, said movable control means being adapted for movement into a second position by frictional engagement of a portion thereof with the sheet material when it moves through the photographic apparatus, said control means when in said second position permitting engagement of the sheet material by said stop means; and actuating means for moving said control means from said second position to said first position.

3. In photographic apparatus adapted to permit photographic sheet material to pass therethrough, means for controlling the movement of said sheet material comprising, in combination: stop means adapted to engage the sheet material for arresting its movement through said apparatus; movable control means which is adapted to contact the sheet material and hold it away from the stop means to prevent engagement thereby, said movable control means being adapted for movement by frictional engagement of a portion thereof with the sheet material when it moves through the photographic apparatus, said movable control means moving into a position at which it no longer holds the sheet material away from said stop means in response to movement of a predetermined length of said sheet material; and means for moving said control means independently of its movement by the sheet material into its position at which it holds the sheet material away from the stop means.

4. In photographic apparatus adapted to permit photographic sheet material to pass therethrough, means for controlling the movement of said sheet material comprising, in combination: stop means adapted to engage the sheet material for arresting its movement through said apparatus; biasing means adapted to contact the sheet material and move it toward said stop means; movable control means which is adapted to contact the sheet material and hold it away from the stop means against the action of said biasing means to prevent engagement by the stop means, said movable control means being adapted for movement by frictional engagement of a portion thereof with the sheet material when it moves through the photographic apparatus, said movable control means moving into a position at which it no longer holds the sheet material away from said stop means in response to movement of a predetermined length of said sheet material; and means for moving said control means independently of its movement by the sheet material into its position at which it holds the sheet material away from the stop means.

5. In photographic apparatus adapted to permit photographic sheet material to pass therethrough along a predetermined path, means for controlling the movement of said sheet material comprising, in combination: stop means extending substantially perpendicular to said predetermined path and adapted to engage predetermined portions of the sheet material to arrest the movement thereof; a movable control member which in a first position has a portion thereof extending substantially perpendicular to said predetermined path and is adapted in said first position to have said portion frictionally engage said sheet material and hold it away from said stop means, said portion of said control member when in said first position being adapted to be moved by said sheet material to a second position when said sheet material moves through said apparatus, said portion of said control member extending substantially parallel to said predetermined path when in said second position thereby permitting engagement of the sheet material by the stop means; and means for moving said control member from said second position to said first position independently of its movement by the sheet material.

6. The invention defined by claim 5 including biasing means adapted to contact the sheet material and move it toward said stop means.

7. The invention defined by claim 5 wherein the predetermined portions of the sheet material comprise a series of spaced openings, the stop means comprise at least one pin adapted to fit into said openings when engaging said sheet material, and the control means comprise a pivotally mounted elongated plate adapted to extend transversely in its direction of elongation relative to the direction of movement of the sheet material along its predetermined path whereby a transverse edge of said plate is adapted to frictionally engage said sheet material when the control means is in said first position.

8. The invention defined by claim 7 including biasing means in the form of a pivotally mounted, spring-loaded elongated platen-like member, said platen-like member being adapted to contact the sheet material and move it toward the stop means.

9. The invention defined by claim 8 wherein the stop means comprise a pair of spaced fixed stop pins between which is mounted the control member, each of said stop pins being adapted to engage oppositely arranged spaced openings provided along said sheet material.

10. The invention defined by claim 9 wherein the platen-like member has a pair of spaced platen sections arranged at opposite ends thereof, said sections being in juxtaposition to said stop pins and provided with slots for receiving said pins when said pins engage said sheet material.

11. The invention defined by claim 10 including a pivotally mounted actuating lever having a portion thereof extending externally from said photographic apparatus, said actuating lever being coupled to said control means.

12. Photographic apparatus containing a supply of sheet material arranged to pass therethrough along a predetermined path; stop means adjacent said path and over which the sheet material passes as it moves through said apparatus, said stop means being arranged to engage predetermined portions of the street material to intermittently arrest its movement past said stop means; movable control means adjacent said stop means having a portion thereof which contacts the sheet material to move it out of engagement with the stop means as the conrol means is moved to a first position, said portion of said control means frictionally engaging the sheet material when the control means is in said first position and being movable by the sheet material as it passes the stop means to establish a second position of the control means, said control means when at said second position permitting a predetermined portion of said sheet material to be engaged by said stop means; and actuating means for moving said control means from said second position to said first position.

13. Photographic apparatus containing a supply of photographic sheet material arranged to pass through said apparatus; stop means arranged for engaging the sheet material for arresting its movement through said apparatus; movable control means which in a first position has a portion thereof contacting the sheet material to hold the sheet material away from the fixed stop means to prevent engagement thereby, said portion frictionally engaging said sheet material when in said first position such that movement of the sheet material past the stop means will cause the control means to move to a second position, said control means when in said second position permitting engagement of the sheet material by the stop means; and actuating means coupled to said control means for moving the control means from said second position to said first position, said sheet material being disengaged from said stop means upon actuation of said actuating means.

14. Photographic apparatus containing a supply of sheet material arranged to pass therethrough, said sheet material being guided along a predetermined path as it moves through said apparatus and having a plurality of predetermined portions spaced along its direction of movement; fixed stop means located in said path; said stop means cooperating with a first of said predetermined portions to engage the sheet material and arrest its movement past the stop means; control means arranged to change the path of the sheet material in the vicinity of said stop means when the control means is moved to a first position such that said first predetermined portion of the sheet material is disengaged from the stop means; a portion of said control means frictionally engaging said sheet material when the control means is in said first position such that movement of the sheet material will cause the control means to move to a second position; said control means when at said second position no longer changing the path of the sheet material from its predetermined path whereby a second predetermined portion of the sheet material may be engaged by the stop means; and actuating means for moving the control means from said second position to said first position.

15. Photographic apparatus containing a supply of sheet material arranged to pass therethrough along a predetermined path, said sheet material having a series of openings spaced along its direct of movement through the camera; a pair of pressure-applying members situated in the path of said sheet material and through which said sheet material moves in its passage through the photographic apparatus; stop means adjacent said path and over which the sheet material passes prior to its movement through said pressure-applying members, said stop means being arranged to engage said openings to arrest the motion of the sheet material past the stop means; a movable control member adjacent the stop means having a portion thereof which contacts the sheet material to move it out of engagement with the stop means as the control member is moved to a first position, said portion of said control member frictionally engaging the sheet material when the control member is in said first position to hold the sheet material away from the stop means, said portion of said control member being movable by the sheet material as it passes the stop means to establish a second position of the control member, said control member when in said second position permitting an opening of said sheet material to be engaged by said stop means, said control member being so constructed and arranged that a predetermined length of the sheet material must move past said stop means before said control member reaches its second position; and actuating means for moving said control member from said second position to said first position independently of its movement by the sheet material.

16. Photographic apparatus containing a supply of sheet material arranged to pass therethrough along a predetermined path, said sheet material having a series of openings spaced along its direction of movement through the camera; a pair of pressure-applying members situated in the path of said sheet material and through which said sheet material moves in its passage through the photographic apparatus; stop means adjacent said path and over which the sheet material passes prior to its movement through said pressure-applying members, said stop means being arranged to engage said openings to arrest the motion of the sheet material past the stop means; a pivotally mounted control member adjacent the stop means having a portion thereof which contacts the sheet material to hold it out of engagement with the stop means when the control member is in a first position, said portion of said control member frictionally engaging the sheet material when the control member is in said first position, and being movable by the sheet material as it passes the stop means to establish a second position of the control member, said control member when in said second position permitting an opening of said sheet material to be engaged by said stop means, said control member being so constructed and arranged that a predetermined length of the sheet material must move past said stop means before said control member reaches its second position; and actuating means for moving said control member from said second position to said first position independently of its movement by the sheet material, said sheet material being disengaged from said stop means in response to actuation of said actuating means.

References Cited in the file of this patent

UNITED STATES PATENTS 2,935,004   Eburn _____ May 3, 1960